United States Patent
Reynolds et al.

(10) Patent No.: US 12,148,018 B2
(45) Date of Patent: *Nov. 19, 2024

(54) SYSTEMS AND METHODS FOR POST-ACQUISITION ASSESSMENT MATCHING

(71) Applicant: Capital One Services, LLC, McLean, VA (US)

(72) Inventors: Anthony Reynolds, Richmond, VA (US); Amitav Parida, Arlington Heights, IL (US); Daniel Kelly, Chicago, IL (US); Jason Samuels, Ladera Ranch, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,483

(22) Filed: Jun. 21, 2023

(65) Prior Publication Data
US 2023/0334548 A1 Oct. 19, 2023

Related U.S. Application Data

(63) Continuation of application No. 17/097,747, filed on Nov. 13, 2020, now Pat. No. 11,720,948.

(51) Int. Cl.
 G06Q 30/00 (2023.01)
 G06Q 30/0283 (2023.01)
 G06Q 30/0601 (2023.01)

(52) U.S. Cl.
 CPC ..... *G06Q 30/0629* (2013.01); *G06Q 30/0283* (2013.01); *G06Q 30/0635* (2013.01)

(58) Field of Classification Search
 USPC .............................. 705/26.1–27.2
 See application file for complete search history.

(56) References Cited

U.S. PATENT DOCUMENTS

2006/0053056 A1* 3/2006 Alspach-Goss ........ G06Q 20/10
 705/14.27
2012/0303430 A1* 11/2012 Tiku .................... G06Q 20/384
 705/14.27

(Continued)

FOREIGN PATENT DOCUMENTS

WO 2006026600 A2 3/2006

OTHER PUBLICATIONS

Extended European search report in European Application No. 21206448.9, dated Apr. 4, 2022 (9 pages).

(Continued)

*Primary Examiner* — Anand Loharikar
(74) *Attorney, Agent, or Firm* — Bookoff McAndrews, PLLC

(57) ABSTRACT

A computer-implemented method for post-acquisition assessment matching may include: receiving interaction information associated with a completed interaction involving an item acquired for a first assessment, the interaction information including an item identifier associated with the acquired item and the first assessment; in response to receiving the interaction information, determining whether the item is available for a second assessment based on the item identifier; in response to determining the second assessment for the item, comparing the first assessment with the second assessment; and in response to determining that the first assessment is higher than the second assessment based on the comparison: adjusting the first assessment based on the second assessment; determining a finalized amount for the interaction based on the adjusted first assessment for the item; and causing completion of the interaction based on the finalized amount.

20 Claims, 5 Drawing Sheets

(56) References Cited

U.S. PATENT DOCUMENTS

| | | |
|---|---|---|
| 2013/0226726 A1 | 8/2013 | Walker et al. |
| 2014/0012783 A1 | 1/2014 | Willis et al. |
| 2014/0316875 A1 | 10/2014 | Tkachenko et al. |
| 2016/0104188 A1* | 4/2016 | Glyman ............. G06Q 30/0234 |
| | | 705/14.34 |

OTHER PUBLICATIONS

Kooijmans, Alex L. et al., "Transaction Processing: Past, Present, and Future", Sep. 28, 2012, IBM Redbooks. ISBN: 0738450782. (Year: 2012).

* cited by examiner

SYSTEMS AND METHODS FOR POST-ACQUISITION ASSESSMENT MATCHING

CROSS-REFERENCE TO RELATED APPLICATION(S)

This patent application is a continuation of, and claims the benefit of priority to, U.S. Nonprovisional patent application Ser. No. 17/097,747, filed on Nov. 13, 2020, the entirety of which is incorporated herein by reference.

TECHNICAL FIELD

Various embodiments of the present disclosure relate generally to processed interactions, and, more particularly, to systems and methods for post-acquisition assessment matching.

BACKGROUND

An item may be offered by different providers for different assessments. A person that desires to acquire the item may be apprehensive of completing an interaction with a provider due to a fear of missing out on a better assessment with a different provider.

One technique to alleviate this fear includes comparison searching. For example, the person may research assessments of the item offered by different providers prior to making an acquisition. However, researching assessments may be undesirable, e.g., time consuming, tedious, difficult, etc. Further, the person may not discover one or more assessments offered for the item, and thus may end up missing out on a better assessment despite the time and effort put into the comparison searching research. Additionally, comparison searching may result in the person making an acquisition from an unfamiliar and/or less reputable provider, which may result in a negative person experience and/or purchase of a defective or deficient item.

Techniques have been developed to facilitate the comparison searching process. For example, an electronic comparison searching tool may be used to retrieve assessments for an item offered by different providers. However, comparison searching tools may still exhibit the issues discussed above. Further, even with the use of tools, comparison searching requires the person to take action prior to making an acquisition, and thus a person that does not take advantage of comparison searching may miss out on the opportunity of a better assessment for their purchase.

The present disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for post-acquisition assessment matching.

In one aspect, an exemplary embodiment of a computer-implemented method for post-acquisition assessment matching may include: receiving, via one or more processors, interaction information associated with a completed interaction involving an item acquired for a first assessment, the interaction information including an item identifier associated with the acquired item and the first assessment; in response to receiving the interaction information, determining, via the one or more processors, whether the item is available for a second assessment based on the item identifier; in response to determining that the item is available for the second assessment, comparing, via the one or more processors, the first assessment with the second assessment; and in response to determining that the first assessment is higher than the second assessment based on the comparison: adjusting, via the one or more processors, the first assessment based on the second assessment; determining, via the one or more processors, a finalized amount for the interaction based on the adjusted first assessment for the item; and causing, via the one or more processors, completion of the interaction based on the finalized amount.

In another aspect, an exemplary embodiment of a post-acquisition assessment-matching system may include: a data storage device storing processor-readable instructions; and one or more processors configured to execute the instructions to perform a method. Such method may include: receiving, via one or more processors, interaction information associated with a completed interaction involving an item acquired for a first assessment, the interaction information including an item identifier associated with the acquired item and the first assessment; in response to receiving the interaction information, determining, via the one or more processors, whether the item is available for a second assessment based on the item identifier; in response to determining that the item is available for the second assessment, comparing, via the one or more processors, the first assessment with the second assessment; and in response to determining that the first assessment is higher than the second assessment based on the comparison: adjusting, via the one or more processors, the first assessment based on the second assessment; determining, via the one or more processors, a finalized amount for the interaction based on the adjusted first assessment for the item; and causing, via the one or more processors, completion of the interaction based on the finalized amount.

In a further aspect, an exemplary embodiment of a computer-implemented method may include: receiving, via one or more processors, interaction information associated with a completed interaction involving an item acquired for a first assessment, the interaction information including an item identifier associated with the acquired item, the first assessment, and a provider identifier associated with the acquired item; in response to receiving the interaction information, determining, via the one or more processors, whether the item is available for a second assessment based on the item identifier; in response to determining that the item is available for the second assessment, comparing, via the one or more processors, the first assessment with the second assessment; and in response to determining that the first assessment is higher than the second assessment based on the comparison: adjusting, via the one or more processors, the first assessment based on the second assessment; determining, via the one or more processors, a finalized amount for the interaction based on the adjusted first assessment for the item; causing, via the one or more processors, completion of the interaction based on the finalized amount; and notifying, via the one or more processors, a person associated with the interaction of one or more of the finalized amount for the interaction, the adjusted first assessment, or the second assessment.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
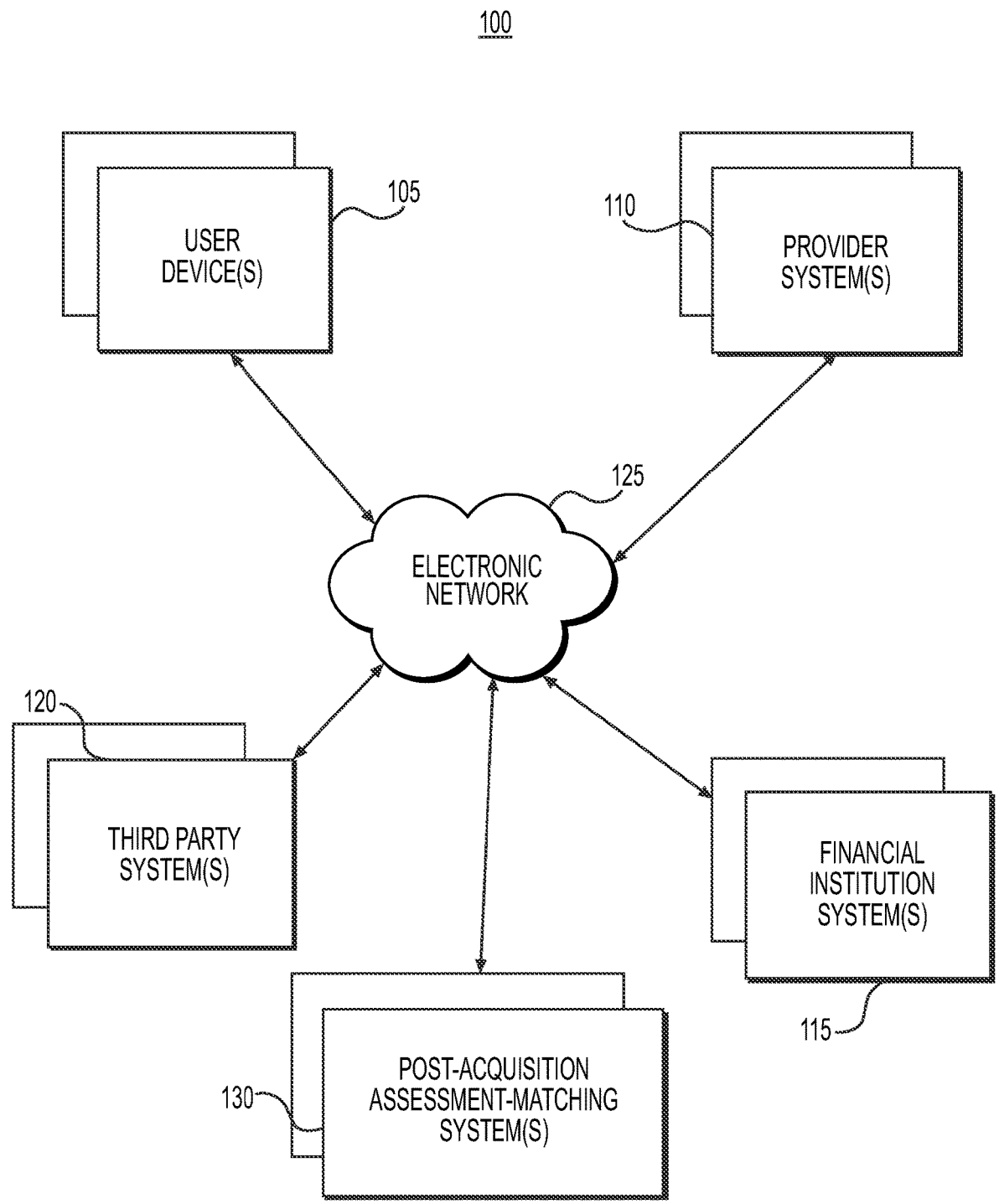
FIG. 1 depicts an exemplary computing environment for post-acquisition assessment matching, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or item that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "provider" generally encompasses an entity or person involved in providing, selling, and/or renting items to persons such as a seller, dealer, renter, merchant, vendor, or the like, as well as an agent or intermediary of such an entity or person. A "person" generally encompasses a person interested in or engaged in an acquisition of an item, or a person that has acquired an item. An "item" generally encompasses a good, service, or the like having ownership or other rights that may be transferred.

A person may desire to acquire (e.g., purchase) an item for the best available assessment (e.g., price). However, the person may not obtain sufficient information in order to find a provider offering the item at the best assessment. Further, once the person makes an acquisition of the item for a given assessment, the person may be unable to benefit from an offer providing a lower assessment. Accordingly, improvements in technology relating to comparison searching are needed.

In the following description, embodiments will be described with reference to the accompanying drawings. As will be discussed in more detail below, in various embodiments, systems and methods for facilitating processed interactions in order to perform post-acquisition assessment-matching, are described.

One or more aspects of the following description may pertain to a processed interaction. A processed interaction, e.g., an interaction conducted via an instrument other than cash (e.g., an interaction item) and that may be processed by one or more third parties in order to be executed, generally includes processing operations such as authorization, clearing, completion (e.g., settlement), and funding. Third parties, e.g., parties other than a buyer or seller or the like, may include entities such as a payment processor, an interaction item issuer (e.g., a credit card company), a banking institution, etc.

Although the operations may vary from interaction to interaction, generally, a processed interaction may proceed as follows. A person may initiate a processed interaction by presenting a non-cash instrument and/or interaction item to a provider such as a credit or debit card, token, scrip, coupon, note, check, e-payment, etc. To authorize the instrument, the provider may submit data associated with interaction to a payment processor. The payment processor may verify that the person has sufficient funds to execute the interaction, e.g., by transmitting at least a portion of the interaction data to the instrument issuer, which may return an interaction authorization to the payment processor and/or the provider, as appropriate. The provider may then proceed with the interaction. Thereafter, the provider may from time to time submit a completion request to the payment processor, which may initiate a transfer of funds from the instrument issuer to the provider, e.g., via one or more banking and/or financial institutions. The instrument issuer may also request a completion from the person from time to time, e.g., via a credit card bill, clearing a check from the person's banking institution, etc.

In an exemplary use case, a person may execute a processed interaction, e.g., by presenting an interaction item other than cash, to make an acquisition of an item from a provider, e.g., at a physical store, e-commerce platform, or the like associated with the provider. The item may be acquired at a first assessment. From time to time, the provider may transmit a completion request to a payment processor associated with the provider. The payment processor may transmit a funding request to a financial institution associated with the interaction item presented by the person. The funding request may be for an amount based on the first assessment. The financial institution may employ a post-acquisition assessment-matching system. For example, the post-acquisition assessment-matching system may determine that the item acquired by the person is available at a second assessment that is preferable to, e.g., lower than, the first assessment. In response to such determination, the post-acquisition assessment-matching system may adjust the amount for the funding request based on the second assessment. For example, the post-acquisition assessment-matching system may adjust the value for the first assessment used to determine the amount for the funding request, and determine an adjusted amount for the funding request based on the adjusted first assessment. The post-acquisition assessment-matching system may initiate and/or cause completion of the funding request based on the adjusted amount, e.g., via a transfer of the adjusted amount from an account associated with the person to an account associated with the provider and/or other associated entities. The post-acquisition assessment-matching system may transmit a notification to one or more of the provider, the payment processor, or the person, e.g., via an electronic message, electronic application, mailing, or the like, indicative of the adjusted amount. Thus, in an example, from the person's perspective, the person may make an acquisition of an item at a first assessment without regard for comparison searching and, after the completion of the acquisition, may nevertheless benefit from a more preferable assessment, without requiring that the person take any particular action.

In some circumstances, the funding request, and/or other communications between entities involved in a processed interaction, e.g., a provider, a payment processor, a financial institution, etc., may not include sufficient information for a post-acquisition assessment-matching system to identify an acquired item in order to perform post-acquisition assessment matching. In some circumstances, the post-acquisition assessment-matching system may be configured to perform post-acquisition assessment matching in response to a person's request. In some circumstances, the post-acquisition assessment-matching system may transmit a request to the person for information usable to identify an acquired item. In some circumstances, the post-acquisition assessment-matching system may be configured to receive information usable to identify an acquired item.

In another exemplary use case, a person may execute a processed interaction to make an acquisition of an item from a provider. The item may be acquired at a first assessment. The post-acquisition assessment-matching system may obtain or receive interaction information including the first assessment and information usable to identify the item, e.g., an item identification number, an item name, a description, an image of the item, or the like. In some examples, the person may transmit the information to the post-acquisition assessment-matching system, e.g., via a user device. In some examples, such a transmission may be in response to a request from the post-acquisition assessment-matching system. In some examples, the post-acquisition assessment-matching system may obtain the information from a provider system associated with the provider, or the like. In response to the transmission, the post-acquisition assessment-matching system may identify the item based on the information in the request, and may determine a second assessment for the item that may be more preferable, e.g., lower, than the first assessment. A financial institution associated with an interaction item used by the person to acquire the item from the provider may receive a funding request for settling the interaction with the provider, e.g., via a payment processor used by the provider to process the interaction. The financial institution may employ the post-acquisition assessment-matching system to adjust an amount for the funding request, e.g., based on the determined second assessment for the item, and may fulfil the funding request based on the adjusted amount. In this manner, a person may request and obtain the benefit of comparison searching after an acquisition is made, such as in circumstances where the post-acquisition assessment-matching system may not receive an identification of the item from the provider.

In an example, the provider, the payment processor, the financial institution, or another entity may provide one or more of a restriction, criteria, limitation, or the like on a post-acquisition assessment-matching of an item. For example, there may be a limited range for adjusting the amount for the assessment of the item, the amount for the funding request, or the like. There may be a limitation on a quantity of a particular item, a quantity of items in an interaction, or the like that may be assessment-matched. There may be a threshold of funds to apply to assessment-matching, e.g., an accumulation of adjustments across interaction within a predetermined period of time, that, when reached, enacts restrictions on assessment-matching of the item or items from the provider. There may be a minimum assessment for an item, irrespective of the determined second assessment for the item. Any suitable restriction, criteria, limitation, or the like may be used.

In a further use case, a person may execute a processed interaction to make an acquisition of an item from a provider. The item may be acquired at a first assessment. The post-acquisition assessment-matching system may obtain or receive interaction information including the first assessment and information usable to identify the item. In response to the transmission, the post-acquisition assessment-matching system may identify the item based on the information in the request, and may determine a second assessment for the item that may be more preferable, e.g., lower, than the first assessment. The post-acquisition assessment-matching system may transmit a notification to the person, e.g., via a user device, that includes information indicating the more preferable second assessment, and/or information describing one or more of where, when, or how the second assessment may be available to the person.

In an additional use case, a person may execute a processed interaction to make an acquisition of an item from a provider. The item may be acquired at a first assessment. The post-acquisition assessment-matching system may obtain or receive interaction information including the first assessment and information usable to identify the item. In response to the transmission, the post-acquisition assessment-matching system may identify the item based on the information in the request, and may determine a second assessment for the item that may be more preferable, e.g., lower, than the first assessment. A financial institution associated with an interaction item used by the person to acquire the item from the provider may receive a funding request for settling the interaction with the provider, e.g., via a payment processor used by the provider to process the interaction. The financial institution may fulfill the funding request based on the first assessment, e.g., an un-adjusted amount. The financial institution may determine a difference between the first assessment and the second assessment, and may execute a further interaction to, for example, compensate the person for the difference in assessment. The compensation may originate from one or more of the provider, the financial institution, the payment processor, or the like.

FIG. 1 depicts an exemplary computing environment 100 that may be utilized with techniques presented herein. One or more user device(s) 105, one or more provider system(s) 110, one or more financial institution system(s) 115, and/or one or more third-party system(s) 120 may communicate across an electronic network 125. As will be discussed in further detail below, one or more post-acquisition assessment-matching system(s) 130 may communicate with one or more of the other components of the computing environment 100. The systems and devices of the computing environment 100 may communicate in any arrangement. As will be discussed herein, systems and/or devices of the computing environment 100 may communicate in order to facilitate a processed interaction in order to perform post-acquisition assessment-matching and/or other actions.

The user device 105 may be a computer system such as, for example, a desktop computer, a mobile device, etc. In an exemplary embodiment, the user device 105 is a cellphone, or the like. In some embodiments, the user device 105 may include one or more electronic application(s), e.g., a program, plugin, etc., installed on a memory of the user device 105. In some embodiments, the electronic application(s) may be associated with one or more of the other components in the computing environment 100. For example, the electronic application(s) may include person authentication tools, a digital wallet of the person, an application that provides access to an e-commerce store-front of a provider associated with the provider device, item search tools, or the like.

In some embodiments, the provider system 110 and/or another system associated with the provider system 110, e.g., a PoS system, may be configured to capture interaction data associated with a processed interaction. Interaction data may include, for example, one or more of an interaction assessment, item(s) associated with the interaction, etc. Interaction data may also include information associated with an interaction item provided by a person and/or the user device 105 such as, for example, one or more of interaction item type, an issuer associated with the interaction item, an account number for the interaction item, authentication information for the interaction item, expiration date information for the interaction item, etc. Interaction data may also include information associated with the person such as, for example, one or more of a name, address, contact information, other interaction items available to the person, etc.

The provider system 110 may include item information, item assessment information, information associated with one or more of a limitation, restriction, criteria, or the like for assessment-matching of one or more items, tax or fee information, etc. The financial institution system(s) 115 may be associated with an interaction item and/or interaction item presented by the person during a processed interaction, a financial account associated with the person, and/or a financial account associated with the provider. The third-party system 120 may include, for example, one or more of a payment processor system, a banking institution, a credit clearing house, or the like, or any other entity that may be associated with a processed interaction.

In various embodiments, the electronic network 125 may be a wide area network ("WAN"), a local area network ("LAN"), personal area network ("PAN"), or the like. In some embodiments, electronic network 125 includes the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

As discussed in further detail below, the post-acquisition assessment-matching system 130 may be configured for one or more of identifying an item acquired in a processed interaction, determining one or more assessments for the item offered by one or more providers, adjust an amount for funding the processed interaction, or causing, enacting, and/or facilitating completion of the processed interaction. Although depicted as separate components in FIG. 1, it should be understood that a component or portion of a component may, in some embodiments, be integrated with or incorporated into one or more other components. For example, a portion of the provider system 110 may be provided to the user device 105 as an electronic portal via the electronic application. At least a portion of post-acquisition assessment-matching system 130 may be integrated into the provider system 110, the financial institution system 115, the user device 105, and/or the third-party system 120. Any suitable arrangement of the various systems and devices of the computing environment 100 may be used.

In the methods below, various acts are described as performed or executed by a component from FIG. 1, such as the post-acquisition assessment-matching system 130. However, it should be understood that in various embodiments, various components of the computing environment 100 discussed above may execute instructions or perform acts including the acts discussed below. Further, it should be understood that in various embodiments, various steps may be added, omitted, and/or rearranged in any suitable manner.

Figure 2:
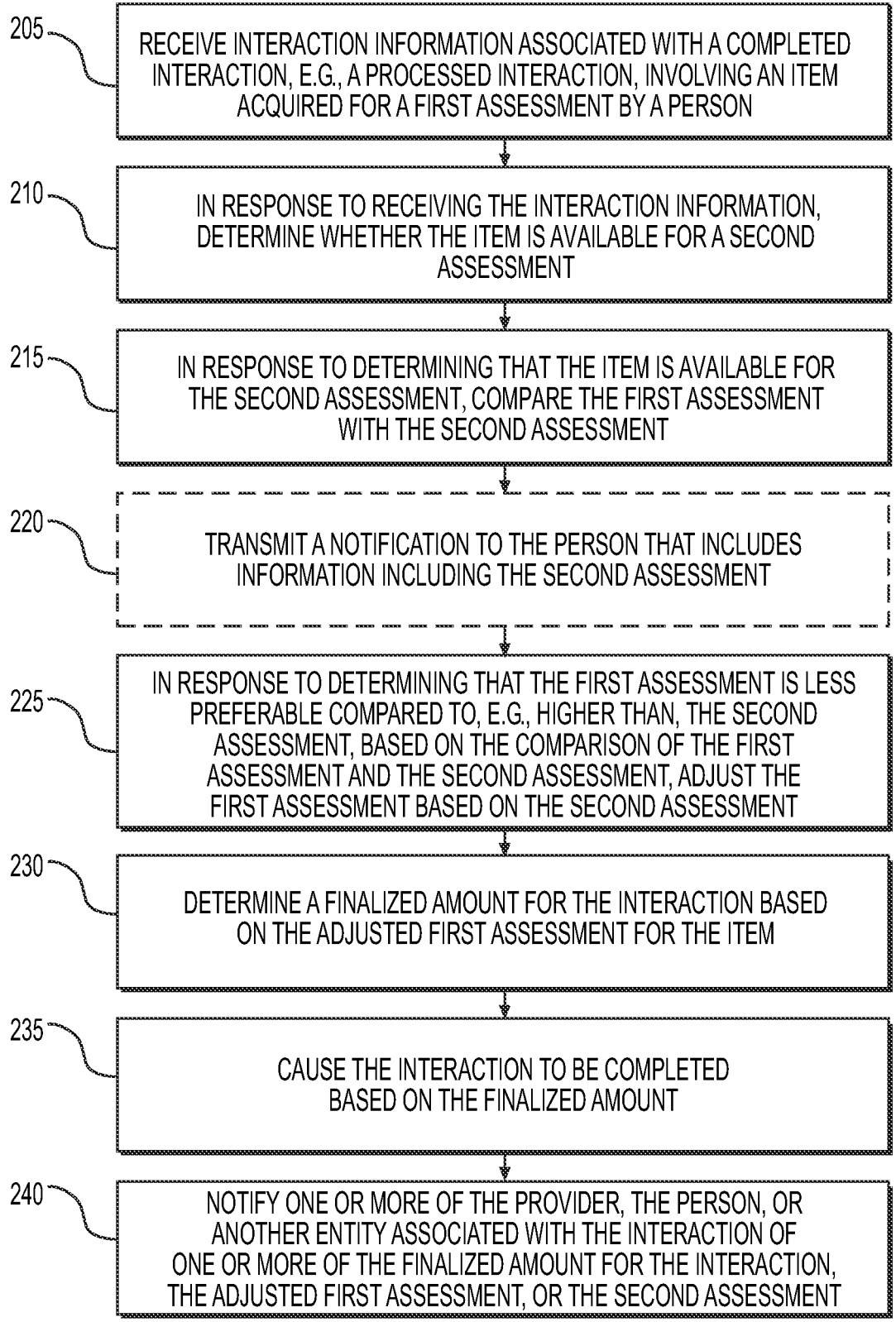
FIG. 2 depicts a flowchart of an exemplary method for post-acquisition assessment matching, according to one or more embodiments.

FIG. 2 illustrates an exemplary process for recommending an interaction item for an interaction between a person and a provider, such as in the various examples discussed above. A person may acquire an item from a provider at a first assessment, e.g., by providing an interaction item to the provider. The person may have and/or be associated with a user device 105, e.g., a mobile device.

At step 205, a post-acquisition assessment-matching system 130 may receive interaction information associated with the completed interaction, e.g., a processed interaction, involving the item acquired for the first assessment. The interaction information may include, for example, information indicative of or usable to determine an identification of the item, e.g., an item identification number or identifier, an item name, a description, an image of the item, or the like. The interaction information may include the first assessment. The interaction information may include interaction item method data for an interaction item used and/or presented by a person to execute the interaction.

Interaction item method data may include, for example, an account number, an expiration date, information associated with an interaction item issuer, information associated with a financial institution associated with the interaction item and/or the person, authentication information, person information such as name or address, available funds or credit, or the like.

In some embodiments, the interaction information may be received in the course of processing the interaction, e.g., via a provider system 110 and/or PoS system used to execute the interaction and/or obtain the interaction item data, a third-party system 120 such as a payment processor system or the like, and/or a financial institution system 115 associated with the interaction item, the person, and/or the provider. For example, in some embodiments, the interaction information may be received with and/or as part of a funding request for settling the interaction. In some embodiments, as discussed in further detail below, the interaction information may be received from the person, e.g., via the user device 105. For example, the person may provide the interaction information with a request for assessment-matching of the acquired item, and/or in response to a request from the post-acquisition assessment-matching system 130.

At step 210, in response to receiving the interaction information, the post-acquisition assessment-matching system 130 may determine, e.g., based on the information usable to identify the item such as an item identifier, whether the item is available for a second assessment. In some embodiments, the interaction, and thus the acquisition of the item at the first assessment, may have occurred at a first point in time, and the post-acquisition assessment-matching system 130 may determine whether the item is available for a second assessment at a second point in time. In some embodiments, the second point in time may occur after the first point in time. In some embodiments, the first point in time may occur after the second point in time. In some embodiments, the post-acquisition assessment-matching system 130 may obtain an assessment for the item that may be offered one or more of before or after the acquisition of the item for the first assessment.

In some embodiments, determining whether the item is available for a second assessment includes accessing a first database of assessments for items, and determining whether the first database includes at least one assessment for the item different than the first assessment. For example, in some embodiments, the first database may cross-reference an item identifier with assessments offered for the item, such that the item identifier is usable to retrieve the assessments offered for the item recorded in the first database. As discussed in further detail below, in some embodiments, the post-acquisition assessment-matching system 130 may determine an item identifier for the item based on the information indicative of or usable to determine an identification of the item.

In some embodiments, the first database may track one or more assessments for items over time. In some embodiments, the first database may retain records of assessments for a predetermined period of time, and/or the post-acquisition assessment-matching system 130 may access a portion of the first database corresponding to a predetermined period of time. In some embodiments, the first database may include predictions of a future assessment for an item. In some embodiments, the first database may include a trend-based assessment for an item, e.g., an average, running average, or the like.

At step 215, in response to determining that the item is available for the second assessment, the post-acquisition assessment-matching system 130 may compare the first assessment with the second assessment. In some embodiments, determining that the item is available for the second assessment includes obtaining at least one assessment for the item from the first database that is different from the first assessment, and selecting one of the at least one obtained assessments as the second assessment.

In some embodiments, selecting one of the at least one obtained assessments as the second assessment includes selecting a lowest of the at least one obtained assessments. In some embodiments, post-acquisition assessment-matching system 130 may obtain incentive information associated with one or more of the at least one obtained assessments, e.g., a second database that includes one or more of a coupon, discount, or other incentive, that may be applied to a particular assessment, a shipping cost, a tax or fee, or the like. In some embodiments, one of the at least one obtained assessments may be selected based on the obtained incentive information. For example, in some embodiments, one of the at least one obtained assessments may be selected based on a highest value to the person, e.g., based on a lowest total amount associated with a respective assessment minus a corresponding incentive. In some embodiments, the second assessment selected by the post-acquisition assessment-matching system 130 may be the respective assessment minus the corresponding incentive, e.g., the actual amount to the person taking any incentives into account, rather than the listed assessment. Any suitable criteria may be used to perform the selection.

Optionally, at step 220, the post-acquisition assessment-matching system 130 may transmit a notification to the person, e.g., via the user device 105, that includes information including the second assessment. In some embodiments, the notification may include a message indicating that the person may have missed out on a better assessment for the item, e.g., the second assessment. In some embodiments, the message may include information describing a provider associated with the second assessment, incentives associated with the second assessment, or other information relevant to the item, the interaction, and/or the second assessment.

At step 225, in response to determining that the first assessment is less preferable compared to, e.g., higher than, the second assessment, based on the comparison of the first assessment and the second assessment, the post-acquisition assessment-matching system 130 may adjust the first assessment based on the second assessment. In some embodiments, the adjustment includes lowering the first assessment by a reduction amount. In some embodiments, the reduction amount is determined based on a difference between the first assessment and the second assessment.

In some embodiments, the provider, the payment processor, the financial institution, the person, and/or another entity associated with the interaction may provide, require, and/or enact one or more restrictions, limitations, criteria, or the like associated with the reduction amount and/or other aspects of the assessment matching of the item.

In some embodiments, there may be a minimum assessment for the item. In some embodiments, determining the reduction amount may include obtaining the minimum assessment for the item, and determining the reduction amount based on a difference between the first assessment and a higher of the minimum assessment and the second assessment. For example, in some embodiments, the minimum assessment may result in the adjusted first assessment being at the least the minimum assessment. In some embodiments, there may be a maximum quantity of items in a single interaction that may be assessment compared. In some embodiments, there may be a maximum amount that a total amount of an interaction that includes one or more items may be reduced by.

In some embodiments, there may be a maximum quantity of the item within a predetermined period of time that may be assessment-matched. For example, further assessment matching for an item may be halted after a predetermined quantity, e.g., 1,000, of the item have been assessment matched within a predetermined period of time, e.g., one day, and assessment matching for the item may resume after the predetermined period of time expires.

In some embodiments, there may be a maximum impact on the provider for assessment matching for the item, and/or for interactions as a whole within a predetermined period of time. For example, values of reduction amounts for the item and/or other items may be accumulated over time to determine a total impact on the provider. Assessment-matching for the provider may be halted in response to the total impact reaching the maximum impact within the predetermined period of time, and may resume after the predetermined period of time expires. In an example, assessment-matching a particular interaction may result in a provider losing out on $3.00, and matching for another interaction may result in the provider losing out on $1.50, and so on, until the total impact on the provider reaches a predetermined maximum impact of $10, $100, $1,000, etc., within a predetermined period of time, e.g., a minute, an hour, a day, a week, a month, etc.

In some embodiments, there may be a restriction preventing assessment-matching for one or more items, categories of items, or the like. In some embodiments, there may be a requirement that the second assessment was available one or more of before, during, or after a period of time in which the first assessment was available and/or a point in time at which the interaction was executed. In some embodiments, there may be a restriction on providers that may be used to provide the second assessment. For example the provider may honor assessment matching from a first other provider, but not from a second other provider.

At step 230, the post-acquisition assessment-matching system 130 may determine a finalized amount for the interaction based on the adjusted first assessment for the item. For example, in some embodiments, the adjustment to the first assessment may be associated with an adjustment to a tax or fee associated with the interaction, and incentive offered to the person, or the like.

At step 235, the post-acquisition assessment-matching system 130 may cause the interaction to be completed based on the finalized amount. Completion may include, for example, a transfer of funds from a financial account associated with the person to a financial account associated with the provider and/or one or more other entities associated with the interaction.

At step 240, the post-acquisition assessment-matching system 130 may notify one or more of the provider, the person, or another entity associated with the interaction of one or more of the finalized amount for the interaction, the adjusted first assessment, or the second assessment. For example, the post-acquisition assessment-matching system 130 may transmit an audit, a financial statement, a message, or the like.

In some embodiments, instead of adjusting the first assessment and determining a finalized amount based on the adjusted first assessment, the post-acquisition assessment-matching system 130 may determine a difference between the first assessment and the second assessment. After fulfilling the completion request based on an unadjusted finalized amount, the post-acquisition assessment-matching system 130 may execute a further interaction to transfer the determined assessment difference to the person. In some embodiments, the further interaction may be funded by one or more of the financial institution, the provider, the payment processor, or the like. In some embodiments, the post-acquisition assessment-matching system 130 may transmit a notification regarding the further interaction to one or more of the person, the provider, or the like.

Figure 3:
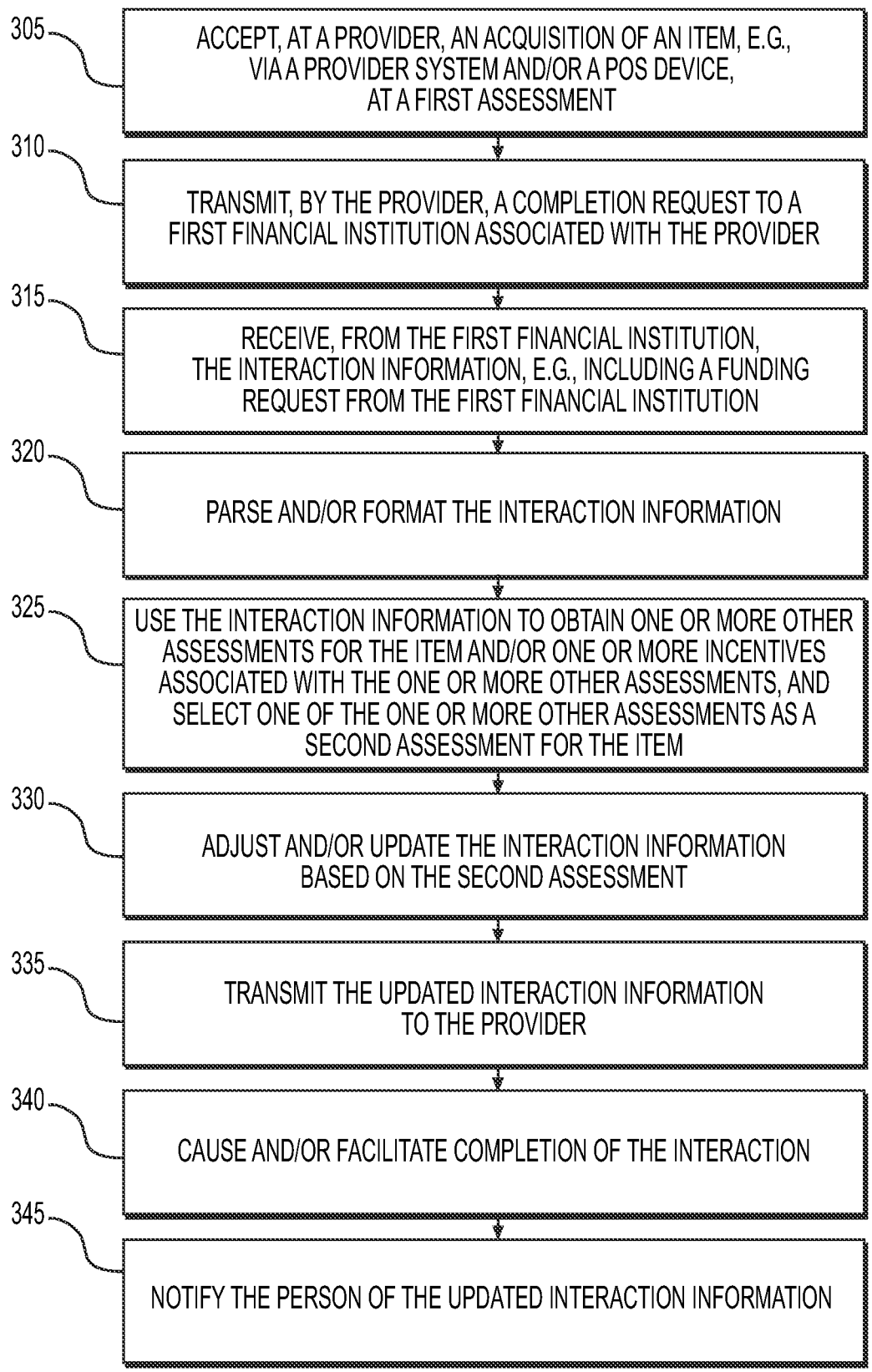
FIG. 3 depicts a flowchart of another exemplary method for post-acquisition assessment matching, according to one or more embodiments.

FIG. 3 illustrates another exemplary process for post-acquisition assessment matching of an item.

At step 305, a provider may accept an acquisition of an item, e.g., via a provider system 110 and/or a PoS device at a first assessment.

At step 310, the provider may transmit a completion request to a first financial institution associated with the provider. The completion request may include interaction information for an interaction including the acquisition of the item.

At step 315, a second financial institution associated with an interaction item used by a person to make the acquisition may receive the interaction information. In some embodiments, the interaction information may be received with a funding request from the first financial institution. In some embodiments, the interaction information may be received from the provider, the person, a third party system 120, or the like.

At step 320, the second financial institution and/or a post-acquisition assessment-matching system 130 associated with the second financial institution may parse and/or format the interaction information. For example, the second financial institution and/or the post-acquisition assessment-matching system 130 may extract information usable to identify the item from the interaction information.

At step 325, the second financial institution and/or the post-acquisition assessment-matching system 130 may use the information usable to identify the item to obtain one or more other assessments for the item and/or one or more incentives associated with the one or more other assessments, and may select one of the one or more other assessments as a second assessment for the item. In some embodiments, step 325 may be performed if any only if one or more limitations, criteria and/or restrictions associated with assessment-matching for the provider are satisfied.

At step 330, the second financial institution and/or the post-acquisition assessment-matching system 130 may adjust and/or update the interaction information based on the second assessment, e.g., by reducing the first assessment by a reduction amount and/or replacing the first assessment with the second assessment.

At step 335, the second financial institution and/or the post-acquisition assessment-matching system 130 may transmit the updated interaction information to the provider.

At step 340, the second financial institution and/or the post-acquisition assessment-matching system 130 may cause and/or facilitate completion of the interaction.

At step 345, the second financial institution and/or the post-acquisition assessment-matching system 130 may notify the person of the updated interaction information.

Figure 4:
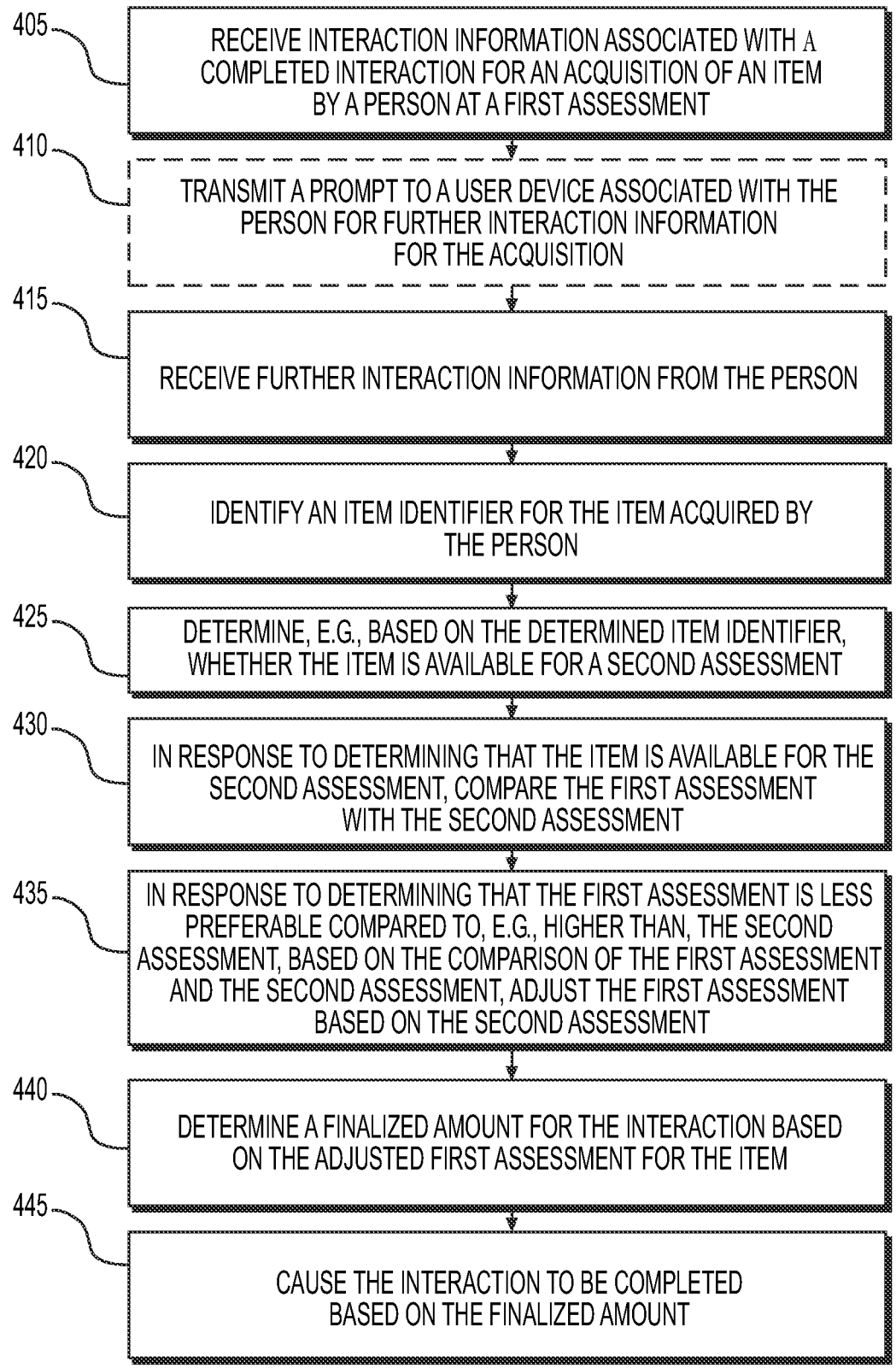
FIG. 4 depicts a flowchart of a further exemplary method for post-acquisition assessment matching, according to one or more embodiments.

FIG. 4 illustrates another exemplary process for post-acquisition assessment matching. A person may purchase an item from a provider at a first assessment, e.g., by providing an interaction item to the provider. The person may have and/or be associated with a user device 105, e.g., a mobile device.

At step 405, the post-acquisition assessment-matching system 130 may receive interaction information associated with the completed interaction, e.g., in the course of the processing of the interaction, such as from one or more of the provider system 110, the financial institution system 115, a third-party system 120, etc. In some embodiments, the interaction information received by the post-acquisition assessment-matching system 130 may include an item identifier usable to identify the item, e.g., in a first database of items and assessments as described above. In some embodiments, the interaction information may not include such an item identifier. For example, the provider may provide different types or amounts of information in the interaction information. For instance, the provider may have an agreement or the like with the financial institution, e.g., is a provider partner, and provides information in the interaction information in accordance with the agreement such as an item identifier or the like. In another instance, the provider may provide information necessary to process the interaction, and may not include information like an item identifier in the interaction information.

Optionally, at step 410, the post-acquisition assessment-matching system 130 may transmit a prompt to the user device 105 for further interaction information for the acquisition. For example, the post-acquisition assessment-matching system 130 may prompt the person, via the user device 105, for information such as, for example, an item name, an item assessment, an item identifier, a description, an image of the item, an image or copy of at least a portion of receipt or statement from the acquisition, etc.

Optionally, at step 415, the post-acquisition assessment-matching system 130 may receive further interaction information from the person, e.g., via the user device. In some embodiments, the further interaction may be received in response to the prompt. In some embodiments, the further interaction information may be received with a request from the person for assessment-matching of the acquisition, e.g., with or without regard to the prompt.

At step 420, the post-acquisition assessment-matching system 130 may identify an item identifier for the item acquired by the person. In some embodiments, the identification may be based on the interaction information, the further interaction information, or the like. For example, in some embodiments, the post-acquisition assessment-matching system 130 may parse an image of a receipt for the interaction received from the person in order to determine information about the acquired item such as one or more of an item name, the first assessment, an item identifier, etc.

In some embodiments, the post-acquisition assessment-matching system 130 may employ an algorithm, a machine learning model, or other techniques usable to determine an item identifier for an item based on one or more portions of item information. U.S. patent application Ser. No. 16/799,429, filed on Feb. 24, 2020, and entitled "Systems and Methods for Generating Price Comparisons," the disclosure of which is incorporated herein in its entirety, discloses various techniques for identifying an item based on one or more portions of item information.

At step 425, the post-acquisition assessment-matching system 130 may determine, e.g., based on the determined item identifier, whether the item is available for a second assessment. In some embodiments, the post-acquisition assessment-matching system 130 may access the first database in the manner discussed above to identify different assessments for the item, and select one of the different assessments as the second assessment. In some embodiments, the post-acquisition assessment-matching system 130 may employ an offer finder algorithm, Application Programming Interface "API", machine learning model, or the like, such as in one or more techniques disclosed by the U.S. patent application Ser. No. 16/799,429 noted above.

At step 430, in response to determining that the item is available for the second assessment, the post-acquisition assessment-matching system 130 may compare the first assessment with the second assessment.

At step 435, in response to determining that the first assessment is less preferable compared to, e.g., higher than, the second assessment, based on the comparison of the first assessment and the second assessment, the post-acquisition assessment-matching system 130 may adjust the first assessment based on the second assessment.

At step 440, the post-acquisition assessment-matching system 130 may determine a finalized amount for the interaction based on the adjusted first assessment for the item.

At step 445, the post-acquisition assessment-matching system 130 may cause the interaction to be completed based on the finalized amount.

Further aspects of the disclosure are discussed in the additional embodiments below. It should be understood that embodiments in this disclosure are exemplary only, and that other embodiments may include various combinations of features from other embodiments, as well as additional or fewer features.

In an exemplary embodiment, instead of and/or in addition to adjusting the first assessment of the item, and determining a finalized amount for an interaction based on the adjusted first assessment, the post-acquisition assessment-matching system 130 may provide a credit or other benefit to the person based on the adjustment to the first assessment. For example, in some embodiments, the post-acquisition assessment-matching system 130 may cause completion of the interaction so that the provider does not experience a change in the assessment for the item paid by the person, and may provide the credit or incentive to the person so that the person may benefit from the comparison searching.

In a further exemplary embodiment, the post-acquisition assessment-matching system 130 may select between applying a credit or incentive and adjusting the first assessment prior to completion of the interaction, e.g., based on a predetermined criteria. For example in some embodiments, the post-acquisition assessment-matching system 130 may provide a credit or incentive if the adjustment to the first assessment is below a first amount, and may adjust the first assessment prior to completion if the adjustment is above the first amount, or vice versa.

In another exemplary embodiment, the post-acquisition assessment-matching system 130 may be configured to only perform assessment matching for an item in response to a request from the person. In some embodiments, the post-acquisition assessment-matching system 130 may be configured to only perform assessment matching on an item acquired within a predetermined period of time, e.g., within the last month, week, or day.

In an additional exemplary embodiment, the post-acquisition assessment-matching system 130 may be used to assessment match an in-progress purchase. For example, as noted above, generally, to process an assessment, a provider submits interaction information that includes assessment information and an interaction assessment to a payment processor. The payment processor may submit the interaction information to the post-acquisition assessment-matching system 130, and the post-acquisition assessment-matching system 130 may determine an adjusted interaction assessment, e.g., in a manner similar to one or more of the examples discussed above. The post-acquisition assessment-matching system 130 may transmit information related to the adjusted interaction assessment and/or other related information such as an offer used to assessment-match one of the items included in the interaction, to the payment processor. The payment processor may authorize the interaction for the adjusted interaction assessment. One or more of the payment processor, the post-acquisition assessment-matching system 130, or the like may transmit a notification indicative of the adjustment to the acquisition assessment to one or more of the person and the provider.

In additional use cases, it should be understood that any of the techniques discussed in one or more of the examples above may be applied to assessment-matching that is employed post-completion, intra-completion, intra-authorization, or at any other point during or after the processing of a processed interaction. In some embodiments, assessment matching for different items in an interaction may occur at different points in or after the processing of the interaction.

In another exemplary embodiment, a computer-implemented method for post-purchase price matching may include: receiving, via one or more processors, transaction information associated with a completed transaction involving a product purchased for a first price, the transaction information including a product identifier associated with the purchased product and the first price; in response to receiving the transaction information, determining, via the one or more processors, whether the product is available for a second price based on the product identifier; in response to determining that the product is available for the second price, comparing, via the one or more processors, the first price with the second price; and in response to determining that the first price is higher than the second price based on the comparison: adjusting, via the one or more processors, the first price based on the second price; determining, via the one or more processors, a finalized amount for the transaction based on the adjusted first price for the product; and causing, via the one or more processors, settlement of the transaction based on the finalized amount.

In some embodiments, determining whether the product is available for a second price includes: accessing a first database of prices for products; and determining whether the first database includes at least one price for the product different from the first price.

In some embodiments, determining that the product is available for the second price includes: obtaining at least one price for the product different from the first price from the first database; and selecting one of the at least one obtained prices as the second price.

In some embodiments, the selecting of the one of the at least one obtained prices as the second price includes: selecting a lowest of the at least one obtained prices.

In some embodiments, adjusting the first price based on the second price includes lowering the first price by a reduction amount.

In some embodiments, the method further includes determining the reduction amount based on a difference between the first price and the second price.

In some embodiments, determining the reduction amount includes: obtaining a minimum price for the product; and determining the reduction amount based on a difference between the first price and a higher of the minimum price and the second price.

In some embodiments, determining the finalized amount for the transaction based on the adjusted first price includes determining one or more of a tax or fee for the transaction based on the adjusted first price.

In some embodiments, the method further includes notifying, via the one or more processors, a merchant associated with the transaction of one or more of the finalized amount for the transaction, the adjusted first price, or the second price.

In some embodiments, the method further includes notifying, via the one or more processors, a customer associated with the transaction of one or more of the finalized amount for the transaction, the adjusted first price, or the second price.

In another exemplary embodiment, a post-purchase price-matching system may include: a data storage device storing processor-readable instructions; and one or more processors configured to execute the instructions to perform a method. The method may include: receiving, via one or more processors, transaction information associated with a completed transaction involving a product purchased for a first price, the transaction information including a product identifier associated with the purchased product and the first price; in response to receiving the transaction information, determining, via the one or more processors, whether the product is available for a second price based on the product identifier; in response to determining that the product is available for the second price, comparing, via the one or more processors, the first price with the second price; and in response to determining that the first price is higher than the second price based on the comparison: adjusting, via the one or more processors, the first price based on the second price; determining, via the one or more processors, a finalized amount for the transaction based on the adjusted first price for the product; and causing, via the one or more processors, settlement of the transaction based on the finalized amount.

In some embodiments, determining whether the product is available for a second price includes: accessing a first database of prices for products; and determining whether the first database includes at least one price for the product different from the first price.

In some embodiments, determining that the product is available for the second price includes: obtaining at least one price for the product different from the first price from the first database; and selecting one of the at least one obtained prices as the second price.

In some embodiments, the selecting of the one of the at least one obtained prices as the second price includes selecting a lowest of the at least one obtained prices.

In some embodiments, adjusting the first price based on the second price includes lowering the first price by a reduction amount.

In some embodiments, the method may further include determining the reduction amount based on a difference between the first price and the second price.

In some embodiments, determining the reduction amount includes: obtaining a minimum price for the product; and determining the reduction amount based on a difference between the first price and a higher of the minimum price and the second price.

In some embodiments, determining the finalized amount for the transaction based on the adjusted first price includes determining one or more of a tax or fee for the transaction based on the adjusted first price.

In some embodiments, the method further includes: notifying, via the one or more processors, a merchant associated with the transaction of one or more of the finalized amount for the transaction, the adjusted first price, or the second price; and notifying, via the one or more processors, a customer associated with the transaction of one or more of the finalized amount for the transaction, the adjusted first price, or the second price.

In a further exemplary embodiment, a computer-implemented method may include: receiving, via one or more processors, transaction information associated with a completed transaction involving a product purchased for a first price, the transaction information including a product identifier associated with the purchased product, the first price, and a merchant identifier associated with the purchased product; in response to receiving the transaction information, determining, via the one or more processors, whether the product is available for a second price based on the product identifier; in response to determining that the product is available for the second price, comparing, via the one or more processors, the first price with the second price; and in response to determining that the first price is higher than the second price based on the comparison: adjusting, via the one or more processors, the first price based on the second price; determining, via the one or more processors, a finalized amount for the transaction based on the adjusted first price for the product; causing, via the one or more processors, settlement of the transaction based on the finalized amount; and notifying, via the one or more processors, a customer associated with the transaction of one or more of the finalized amount for the transaction, the adjusted first price, or the second price.

In general, any process or operation discussed in this disclosure that is understood to be computer-implementable, such as the process illustrated in FIGS. 2-4, may be performed by one or more processors of a computer system, such any of the systems or devices in the computing environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 5:
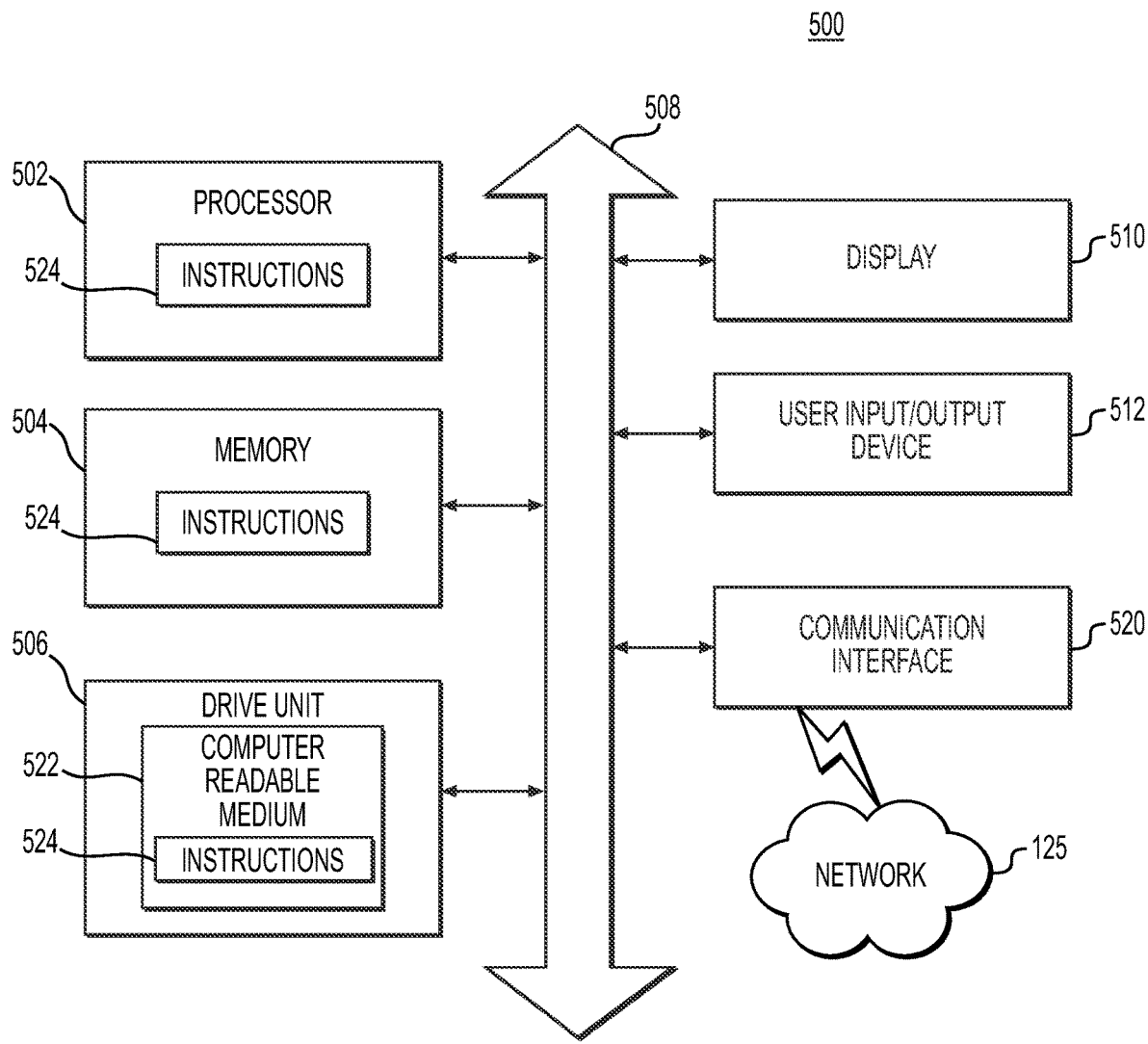
FIG. 5 depicts an example of a computing device, according to one or more embodiments.

FIG. 5 is a simplified functional block diagram of a computer 500 that may be configured as a device for executing the methods of FIGS. 2-4, according to exemplary embodiments of the present disclosure. FIG. 5 is a simplified functional block diagram of a computer that may be configured as the post-acquisition assessment-matching system 130 and/or another system according to exemplary embodiments of the present disclosure. In various embodiments, any of the systems herein may be a computer 500 including, for example, a data communication interface 520 for packet data communication. The computer 500 also may include a central processing unit ("CPU") 502, in the form of one or more processors, for executing program instructions. The computer 500 may include an internal communication bus 508, and a storage unit 506 (such as ROM, HDD, SDD, etc.) that may store data on a computer readable medium 522, although the computer 500 may receive programming and data via network communications. The computer 500 may also have a memory 504 (such as RAM) storing instructions 524 for executing techniques presented herein, although the instructions 524 may be stored temporarily or permanently within other modules of computer 500 (e.g., processor 502 and/or computer readable medium 522). The computer 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for post-purchase price matching, comprising:
   receiving, via one or more processors, a funding request regarding settlement of a completed transaction involving an item purchased for a first price, the request received from a provider of the item and including transaction information associated with the completed transaction, the transaction information including an amount of the first price;
   in response to receiving the transaction information, determining, based on the amount of the first price received with the transaction information, an identifier associated with the item;
   with reference to the identifier associated with the item, accessing an Application Programming Interface (API) configured to determine whether the item is available for a second price;
   in response to receiving, via the one or more processors and from the API, an indication that the item is available for the second price, comparing, via the one or more processors, the first price with the second price; and
   in response to determining that the first price is higher than the second price based on the comparison:
      adjusting, via the one or more processors, the first price based on the second price;
      determining, via the one or more processors, a finalized amount for the completed transaction based on the adjusted first price for the item; and
      causing, via the one or more processors, a settlement of the completed transaction based on the finalized amount to be transferred to the provider.

2. The computer-implemented method of claim 1, wherein the determining of the identifier, the accessing, the comparing, the determining of the finalized amount, and the causing are performed only upon determining that the funding request has been received within a predetermined period of time surrounding occurrence of the completed transaction.

3. The computer-implemented method of claim 1, wherein the adjusting of the first price is further based on one or more of a discount or membership applicable to the second price.

4. The computer-implemented method of claim 1, wherein the determining of the identifier, the accessing, the comparing, the determining of the finalized amount, and the causing are performed only upon determining that the provider is pre-approved for post-purchase price-matching.

5. The computer-implemented method of claim 1, wherein determining that the first price is higher than the second price based on the comparison includes only determining that the first price is higher than the second price upon determining that the first price is higher than the second price by at least a threshold amount.

6. The computer-implemented method of claim 1, wherein the adjusting of the first price is a lowering of the first price by a lesser of (i) a different between the first price and the second price, and (ii) a predetermined threshold amount.

7. The computer-implemented method of claim 1, wherein the determining of the identifier, the accessing, the comparing, the determining of the finalized amount, and the causing are performed only upon determining one or more of:
   that less than a threshold number of adjustments to prices of items of the provider have been made within a predetermined period of time;
   that a total value of the adjustment to the prices of items of the provider within the predetermined period of time is less than a predetermined amount; or
   that less than a further threshold number of adjustments of price of items of the provider have been made for a purchaser of the item within the predetermined period of time.

8. A system for post-purchase price matching, comprising:
   at least one memory storing instructions; and
   at least one processor operatively connected to the at least one memory, and configured to execute the instructions to perform operations, including:
      receiving, via one or more processors, a funding request regarding settlement of a completed transaction involving an item purchased for a first price, the request received from a provider of the item and including transaction information associated with the completed transaction, the transaction information including an amount of the first price;
      in response to receiving the transaction information, determining, based on the amount of the first price received with the transaction information, an identifier associated with the item;
      with reference to the identifier associated with the item, accessing an Application Programming Interface (API) configured to determine whether the item is available for a second price;
      in response to receiving, via the one or more processors and from the API, an indication that the item is available for the second price, comparing, via the one or more processors, the first price with the second price; and
      in response to determining that the first price is higher than the second price based on the comparison:
         adjusting, via the one or more processors, the first price based on the second price;
         determining, via the one or more processors, a finalized amount for the completed transaction based on the adjusted first price for the item; and
         causing, via the one or more processors, a settlement of the completed transaction based on the finalized amount to be transferred to the provider.

9. The system of claim 8, wherein the determining of the identifier, the accessing, the comparing, the determining of the finalized amount, and the causing are performed only upon determining that the funding request has been received within a predetermined period of time surrounding occurrence of the completed transaction.

10. The system of claim 8, wherein the adjusting of the first price is further based on one or more of a discount or membership applicable to the second price.

11. The system of claim 8, wherein the determining of the identifier, the accessing, the comparing, the determining of the finalized amount, and the causing are performed only upon determining that the provider is pre-approved for post-purchase price-matching.

12. The system of claim 8, wherein determining that the first price is higher than the second price based on the comparison includes only determining that the first price is higher than the second price upon determining that the first price is higher than the second price by at least a threshold amount.

13. The system of claim 8, wherein the adjusting of the first price is a lowering of the first price by a lesser of (i) a different between the first price and the second price, and (ii) a predetermined threshold amount.

14. The system of claim 8, wherein the determining of the identifier, the accessing, the comparing, the determining of the finalized amount, and the causing are performed only upon determining one or more of:
    that less than a threshold number of adjustments to prices of items of the provider have been made within a predetermined period of time;
    that a total value of the adjustment to the prices of items of the provider within the predetermined period of time is less than a predetermined amount; or
    that less than a further threshold number of adjustments of price of items of the provider have been made for a purchaser of the item within the predetermined period of time.

15. A non-transitory computer-readable medium comprising instructions for post-purchase price matching, the instructions executable by at least one processor to perform operations, including:
    receiving a funding request regarding settlement of a completed transaction involving an item purchased for a first price, the request received from a provider of the item and including transaction information associated with the completed transaction, the transaction information including an amount of the first price;
    in response to receiving the transaction information, determining, based on the amount of the first price received with the transaction information, an identifier associated with the item;
    with reference to the identifier associated with the item, accessing an Application Programming Interface (API) configured to determine whether the item is available for a second price;
    in response to receiving, via the at least one processor and from the API, an indication that the item is available for the second price, comparing, via the one or more processors, the first price with the second price; and
    in response to determining that the first price is higher than the second price based on the comparison:
        adjusting the first price based on the second price;
        determining a finalized amount for the completed transaction based on the adjusted first price for the item; and
        causing a settlement of the completed transaction based on the finalized amount to be transferred to the provider.

16. The non-transitory computer-readable medium of claim 15, wherein the determining of the identifier, the accessing, the comparing, the determining of the finalized amount, and the causing are performed only upon determining that the funding request has been received within a predetermined period of time surrounding occurrence of the completed transaction.

17. The non-transitory computer-readable medium of claim 15, wherein the adjusting of the first price is further based on one or more of a discount or membership applicable to the second price.

18. The non-transitory computer-readable medium of claim 15, wherein the determining of the identifier, the accessing, the comparing, the determining of the finalized amount, and the causing are performed only upon determining that the provider is pre-approved for post-purchase price-matching.

19. The non-transitory computer-readable medium of claim 15, wherein determining that the first price is higher than the second price based on the comparison includes only determining that the first price is higher than the second price upon determining that the first price is higher than the second price by at least a threshold amount.

20. The non-transitory computer-readable medium of claim 15, wherein the determining of the identifier, the accessing, the comparing, the determining of the finalized amount, and the causing are performed only upon determining one or more of:
    that less than a threshold number of adjustments to prices of items of the provider have been made within a predetermined period of time;
    that a total value of the adjustment to the prices of items of the provider within the predetermined period of time is less than a predetermined amount; or
    that less than a further threshold number of adjustments of price of items of the provider have been made for a purchaser of the item within the predetermined period of time.

\* \* \* \* \*